United States Patent [19]

Yoder

[11] Patent Number: 5,048,448
[45] Date of Patent: Sep. 17, 1991

[54] BOAT DOCK STRUCTURE

[75] Inventor: Dennis G. Yoder, Nappanee, Ind.
[73] Assignee: CTB, Inc., Milford, Ind.
[21] Appl. No.: 452,246
[22] Filed: Dec. 15, 1989
[51] Int. Cl.$^5$ ............................................. B63B 35/44
[52] U.S. Cl. ................................. 114/263; 114/266; 52/588; 463/381
[58] Field of Search ................ 114/263, 266, 267, 85, 114/356, 61, 352; 405/218–221; 52/177, 585, 588; 403/353, 381; 14/2.6, 27, 75; 404/17, 41

[56] References Cited

U.S. PATENT DOCUMENTS

| | | | |
|---|---|---|---|
| 1,923,544 | 8/1933 | Leonard et al. | 114/356 |
| 3,587,503 | 6/1971 | Stehr | 114/266 |
| 3,620,027 | 4/1968 | Nordell | 405/219 |
| 3,964,221 | 6/1976 | Berquist | 52/177 |
| 3,999,397 | 12/1976 | Albery | 405/218 |
| 4,078,515 | 3/1978 | Svirklys | 405/219 X |
| 4,266,381 | 5/1981 | Deller | 52/177 |
| 4,349,297 | 9/1982 | Misener | 405/221 |
| 4,352,597 | 10/1982 | Kay | 405/219 |
| 4,892,052 | 1/1990 | Zook et al. | 114/85 |

Primary Examiner—Ed Swinehart
Attorney, Agent, or Firm—Trexler, Bushnell, Giangiorgi & Blackstone, Ltd.

[57] ABSTRACT

A dock structure, adapted to mount to a frame, having clips which are attached to the frame and plank members which are assembled to the clips. Both the clips and the planks are integrally formed of plastic to provide high weatherability, durability and pleasing aesthetics. In assembly, clips are securely attached to the frame and a plank member is adapted to securely attach to the clips thus concealing any fasteners which secure the dock structure to the underlying structural frame.

18 Claims, 2 Drawing Sheets

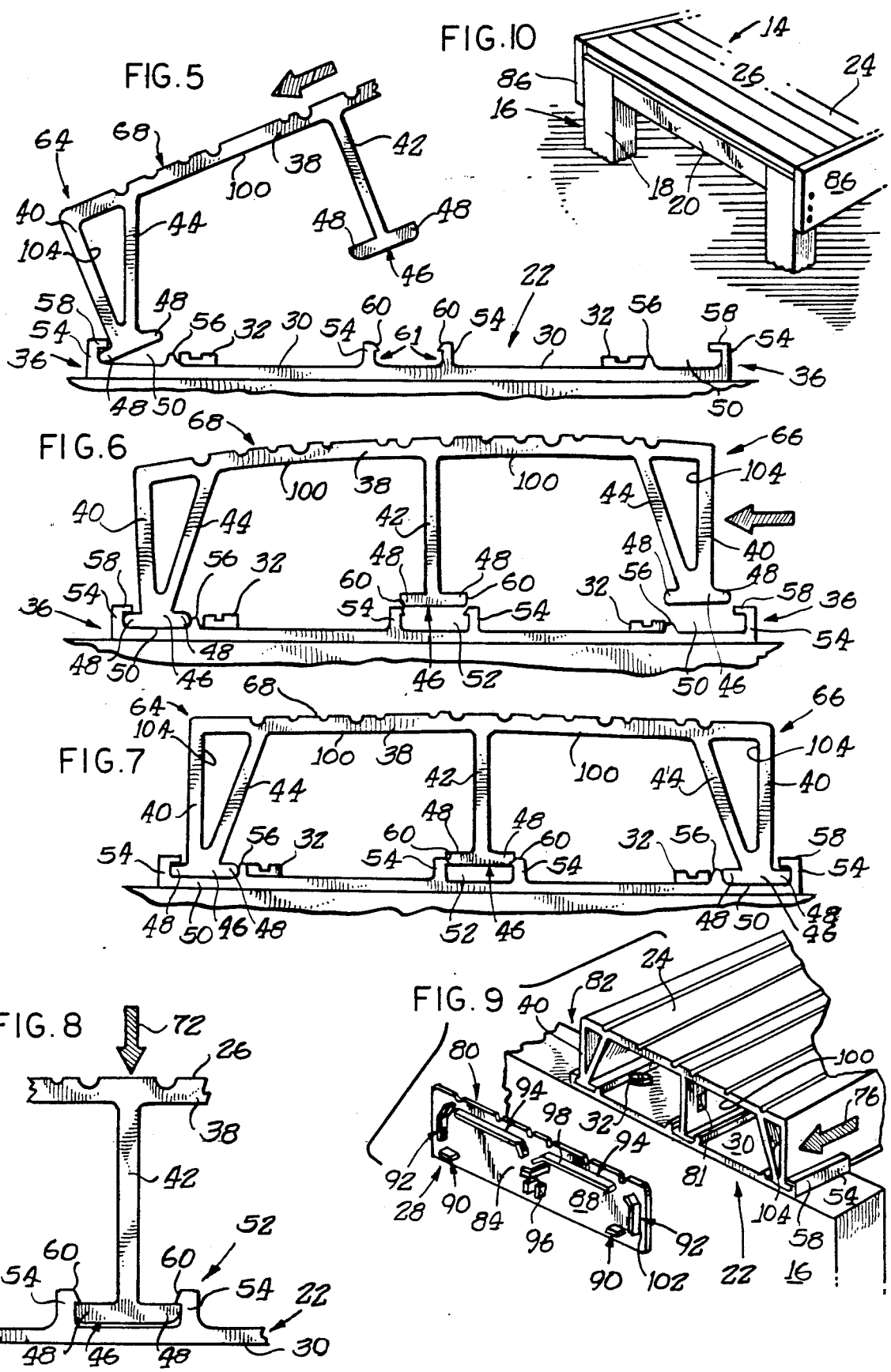

5,048,448

BOAT DOCK STRUCTURE

BACKGROUND OF THE INVENTION

This invention relates generally to the dock accessory arts and more particularly to dock structures adapted for mounting to a frame or the like.

Boating is considered by many to be the number one outdoor recreational activity in the United States today. More people than ever are enjoying recreational boating activities ranging from canoeing to yachting. The increase in the number of boats on America's waterways has likewise increased the need for the number of slips, piers and docks at which to moor these watercraft.

Docks are generally constructed in either a fixed dock or a floating dock arrangement. A fixed dock is comprised of pilings or piers which are driven into the floor of a body of water; stringers are secured to these pilings creating a support frame to which planks are appropriately attached. The floating dock is essentially comprised of a deck surface which floats on buoyancy material secured underneath the deck surface.

In the floating dock configuration, a series of floating deck sections are often attached to one another to create a larger or longer floating surface.

Typically, docks are constructed of wood or metal planking fastened to the support frame. While wood and metal planking have been accepted as decking materials, mainly because of a lack of alternatives, there are many problems associated with these decking materials and the fasteners used to secure them to the frame. Wood planking tends to warp, splinter and rot; problems which are inherent in wood and accelerated in a harsh marine environment. Likewise, extruded metal planking, most commonly aluminum, tends to corrode in the humid marine environment and often becomes uncomfortably hot in direct sun.

Further, both of these materials are difficult to reliably attach to the underlying support structure. For example, the nails, screws or other fasteners used to hold the planking down tend to loosen over a period of use and protrude through the top surface of the planking creating a potential hazard. Also, once fasteners become loose, the planks become unstable and may even become detached.

OBJECTS AND SUMMARY OF THE INVENTION

A general object of the present invention is to provide a boat dock structure adapted to be mounted to a frame or the like and which resists deterioration in a marine environment.

Another object of the present invention is to provide a dock structure which is weather resistant, durable, and aesthetically pleasing.

Still another object of the present invention is to provide a dock structure that is easy to assemble and is securely retained in its assembled state.

Briefly, and in accordance with the foregoing, the present invention comprises a dock structure, adapted to mount to a frame or the like, having clip means which attach to the frame and plank members which are assembled to the clip means. Both the clips and the planks are integrally formed of plastic to provide high weatherability, durability and pleasing aesthetics. In assembly, clips are securely attached to the frame and a plank member is adapted to securely attach to the clips thus concealing any fasteners which secure the dock structure to the underlying structural frame.

BRIEF DESCRIPTION OF THE DRAWINGS

The organization and manner of operation of the invention, together with the further objects and advantages thereof, may best be understood by reference to the following description taken in connection with the accompanying drawings in which like reference numerals identify like elements in which:

FIG. 5 is an end view which illustrates the assembly of a first side of a plank member to a clip secured to an underlying support structure as viewed from the end of the planks as shown in FIG. 2;

FIG. 6 is an end view which illustrates the fastening of a second side of the plank to the clip;

FIG. 7 is an end view which illustrates the plank member positioned for the final step required to attach the plank to the clip;

FIG. 8 is an enlarged partial end view which illustrates downward compression on an intermediate flange portion attached to the upper web portion of the plank for snapping the foot of the intermediate flange into a plank receiving means integrally formed in said clip;

FIG. 9 is a partial perspective view of the plank attached to the clip by sliding the plank into engagement with the clip and attachment of a plank cap to the exposed end of the plank member; and FIG. 10 is a partial perspective view of the dock structure attached to an underlying support frame in which the planks are oriented such that the ends are covered by a common end plank instead of plank caps as illustrated in FIG. 9.

DETAILED DESCRIPTION OF THE ILLUSTRATED EMBODIMENT

Figure 1:
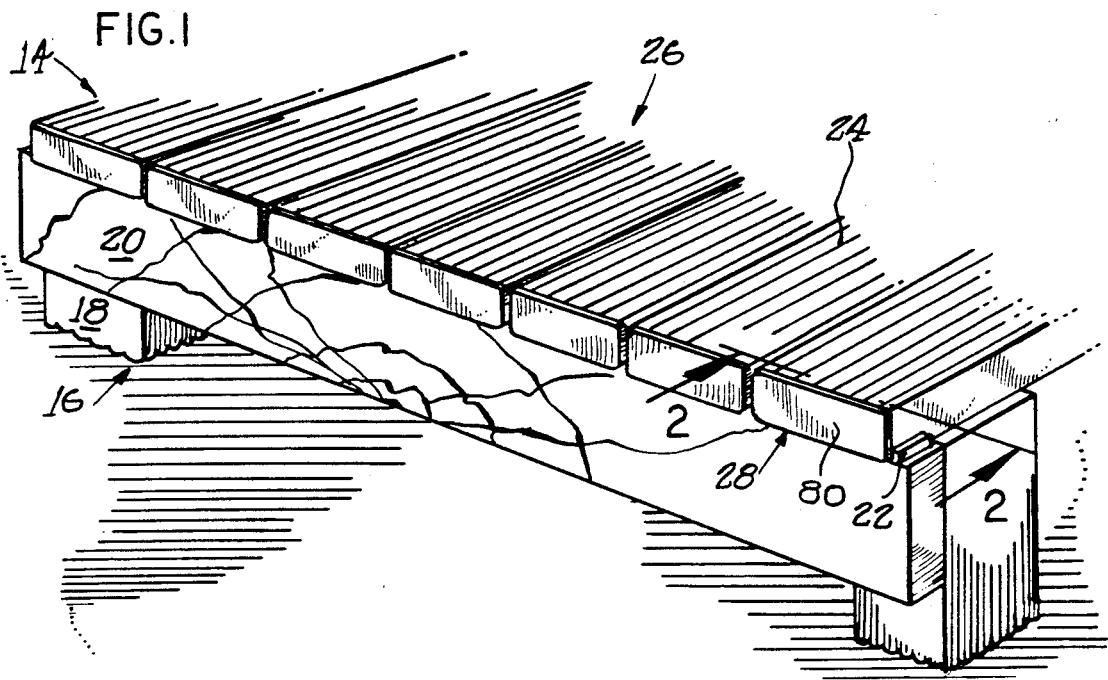
FIG. 1 is a partial perspective view of an assembled dock structure comprising plank members attached to clips which are fastened to an underlying support structure in accordance with the invention.

While this invention is susceptible to embodiment in many different forms, there is shown in the drawings and will be herein described in detail, specific embodiments with the understanding that the present disclosure is to be considered an exemplification of the principles of the invention, and is not intended to limit the invention to the embodiments illustrated.

As illustrated in the partial perspective view of FIG. 1, an assembled dock structure 14 is attached to a support structure or frame 16. The frame 16 comprises pilings or posts 18 driven into the earth below with stringers 20 running therebetween to support the dock structure 14 between the posts 18. Likewise, the frame 16 is attachable to bouyancy material in lieu of the frame 16. Clip means 22 (better illustrated in FIG. 2) are attached to the frame 16 for engaging and securely retaining plank members 24 to form the top plane or surface 26 of the dock structure 14. Each plank member 24 having an open end may be covered with a plank cap 28 which will be described in further detail herein below.

Figure 2:
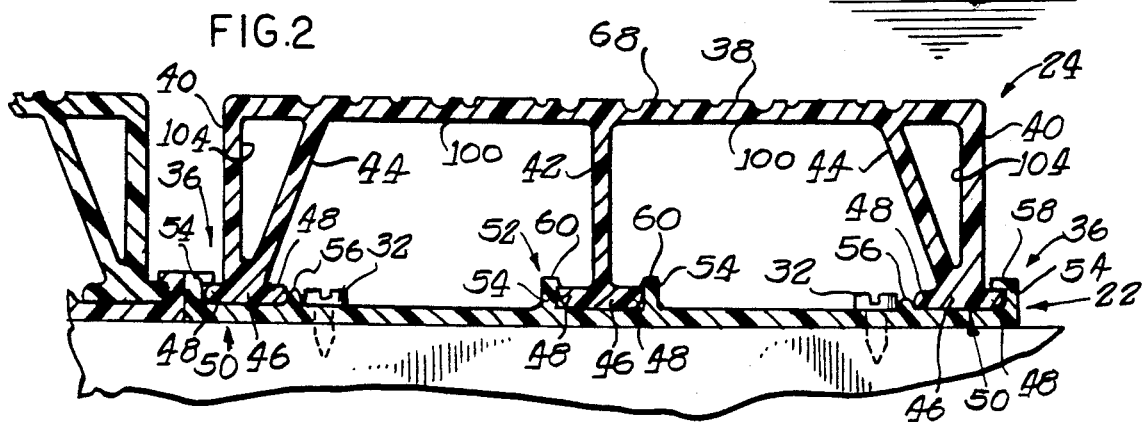
FIG. 2 is an enlarged partial cross sectional view of the dock structure taken along line 2—2 in FIG. 1 and showing a clip attached to the underlying support structure and a plank member retainably fastened to the clip.
Figure 4:
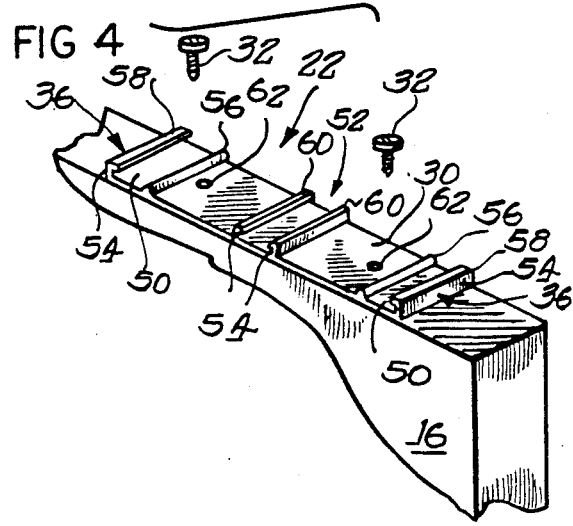
FIG. 4 is an enlarged partial perspective view of the clip positioned on the underlying support member with fastening means prepared to be inserted therethrough to securely affix the clip to the support member.

FIG. 2 provides an enlarged partial cross sectional view of the dock structure 14 taken along the line 2—2 in FIG. 1 and shows a clip 22 attached to a frame 16 and to which is securely attached a plank member 24. Clip means 22 is formed with an elongate base portion 30 which is secured to the frame 16 by fasteners 32 (as illustrated in FIG. 2 and FIG. 4). Positioned beneath the plank member 24, the fasteners 32 are concealed when used to attach the clip 22 to the frame 16. The elongate base portion 30 is formed with plank receiving means 36 which engage and securely retain the plank member 24 with the clip 22.

As shown in FIG. 2, the plank member 24 is formed with an upper web portion 38 to which is attached flange supporting means or supports 40. Each outward edge of the plank member 24 has a support 40 projecting downwardly from the upper web portion 38 to provide side support to the plank member 24. An intermediate flange supporting mean 42 is formed generally midway between the support means 40 to provide central support of the plank member 24. To provide additional structural reinforcement of the upper web portion 38, a supporting brace 44 joins the upper web portion 38 at a position generally between the support means 40 and the intermediate support 42 and extends downwardly therefrom to join the support 40 in a generally diagonal fashion.

On an end of the support 40 and intermediate support 42 distal the upper web portion 38 flange means 46 are formed for cooperatively mating with said plank receiving means 36 to secure the plank member 24 in engagement with the clip means 22. The flange means 46 comprise laterally oppositely outwardly projecting members 48 formed on both sides of the support 40 and intermediate support 42. The laterally oppositely outwardly projecting members or lateral members 48 are engagable with the plank receiving means 36. The plank receiving means 36 generally secure the flange means 46 in the same manner, however, the plank receiving means 36 will be described in further detail in terms of side plank receiving means 50 and intermediate flange receiving means 52.

Each of the two most distant ends of the elongate base portion 30 has a side plank receiving means 50 integrally formed therein. The side plank receiving means 50 generally comprise a flange engaging portion 54 formed on the outside edge of the elongate base portion 30 and a rib 56 formed medial to the flange engaging portion 54. Each flange engaging portion 54 formed on each end of the elongate base portion 30 has a locking tab 58 cantilevered over and projecting inwardly toward the center of the clip means 22. When securing the plank member 24 to the clip means 22, the outwardly projecting lateral member 48 is positioned underneath a corresponding inwardly projecting locking tab 58. The ribs 56 are formed on the side of the elongate base portion 30 spaced inwardly from the flange engaging portions 54 for abutting the inner face of the medially projecting lateral member 48 of the flange means 46 for preventing horizontal displacement of the flange means 48 when fully engaged with the locking tabs 58.

Similar to the support 40, the intermediate support 42 has a flange means 46 formed on the end thereof distal the upper web portion 38. The lateral members 48 of the flange 46 are retained in the intermediate flange receiving means 52. The intermediate flange receiving means 52 comprises a pair of inwardly projecting locking tabs 60 which are inwardly cantilevered over the elongate base portion 30. A space 61 (see FIG. 5) is provided between the medial locking tabs 60 which is approximately equal to a lateral dimension of the flange means 46 as measured between the two end points of the lateral members 48. The medial locking tabs 60 project slightly inwardly towards each other such that when a flange 46 is positioned therebetween the tabs overlie the lateral members 48 of the flange 46 to retain the flange member 46 therebetween.

It should be noted that both the plank member 24 and the clip means 22 are respectively unitary one piece members which are integrally formed preferably, although not necessarily, through an extrusion process. The plank member 24 and the clip means illustrated in the present invention are formed of a generally rigid plastic, composite or engineered plastic having flexibility characteristics which permit it to be assembled as will be described herein below. Such materials provide a high degree of weatherability and deterioration resistance as well as few, if any, maintenance requirements.

It should be obvious to one skilled in the art that the plank member 24 and the clip 22 formed by an extrusion process will have all of the features illustrated in the cross section of FIG. 2 generally extending the length of the respective member. The clip means 22 is generally a section cut from a longer extrusion whereas the plank member 24 is generally a long continuously extruded piece cut to a desired length.

Figure 3:
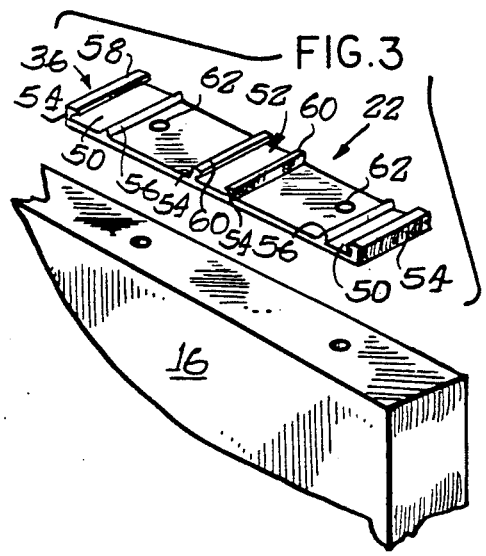
FIG. 3 an enlarged exploded, partial perspective view illustrating the features of the clip and its positioning over an underlying support member.

Assembly of the dock structure requires the initial step of securing the clip means 22 to the frame 16. FIG. 3 and FIG. 4 illustrate the method by which the clip means is affixed to the frame 16 Generally, when fasteners 32 are used to affix the clip 22 to the frame 16, a fastening bore 62 is formed therethrough. The clip 22 is fastened to the frame 16 with the plank receiving means 36 in an upwardly directed orientation to which the plank member 24 may be perpendicularly attached.

As illustrated in FIG. 5, once the clip 22 has been attached to the frame 16, the outwardly directed lateral member 48 of the flange means 46 of a first side 64 of the plank member 24 is engaged underneath the locking tabs 58 of the corresponding side of the clip means 22. As shown in FIG. 5, the side lateral member 48 is angularly inserted underneath the locking tab 58 to permit the opposing lateral member 48 of the flange 46 being inserted into the flange engaging portion 54 to clear the fastener 32 used to secure the clip 22 to the frame 16. Positioned as such, the plank is generally downwardly moved to engage the medial lateral member 48 with the rib 56 to prevent horizontal motion of the flange 46 positioned in the plank receiving means 36.

The next step in attaching the plank member 24 to the clip means 22 is illustrated in FIG. 6, where a second side 66 opposite the retained first side 64 of the plank member 24 is positioned directly above a corresponding plank receiving means 36. Attachment of the second side 66 is facilitated by the flexible characteristics of the material used in forming the plank member 24 permitting the plank 24 to be slightly flexed to permit the lateral member 48 of the second side 66 to be angularly inserted underneath the locking tab 58 of the corresponding flange engaging portion 54. When engaging the second side 66, once the lateral member 48 is positioned under the locking tab 58, a slight downward force applied to the top surface 68 of the upper web portion 38 above the support 40 of the second side 66 may be required to force the medial lateral member 48 in position against the rib 56.

FIG. 7 illustrates the plank member 24 having a first side 64 and a second side 66 retained within corresponding plank receiving means 36. As illustrated in FIG. 7, the flange 46 of the intermediate support 42 is positioned on top of the locking tabs 60 of the intermediate flange receiving means 52. Depending upon the flexibility characteristics of the material used in forming the clip 22, the force created by the slightly upwardly flexed upper web portion 38 may force the flange 46 into engagement with the intermediate flange receiving means 52. However, if the material used in the clip 22 is rigid enough to withstand the downward force created by the upwardly flexed upper web portion 38, a slight downward force applied to the top surface 68 of the upper web portion 38 generally in the area directly above the intermediate support 42 may be necessary to force the flange 46 into engagement with the intermediate flange receiving means 52.

The material used in forming the clip means 22 should be sufficiently flexible to permit the flange engaging portions 54 of the intermediate flange receiving means 52 to flex slightly outwardly away from each other to receive the lateral members 48 of the locking tabs 60 when the flange 46 is positioned thereover and a downwardly directed force is applied thereto. Upon application of the force to the top surface 68, the flange 46 snappingly engages the intermediate flange receiving means 52 thereby providing additional secure support of the plank member 24 to the clip 22. The downward force is represented in FIG. 8 by the arrow 72 whereupon the engaged flange 46 is shown to be secured underneath the inwardly projecting locking tabs 60.

FIG. 9 illustrates an alternative method of mounting the plank member 24 to the clip 22. As indicated by arrow 76, the plank member 24 is positioned relative to the clip to slide the plank 24 into engagement with the clip 22. Using this method of attachment, downward compressive forces on the plank member 24 are not necessary since the plank 24 can be easily slid into engagement with the clip 22. It should be obvious to one skilled in the art that either method can be used to secure the plank 24 to the clip 22 and that one method may be preferred over another depending upon circumstances of installation.

As also shown in FIG. 9, the plank cap 28 has a generally planar surface having dimensions corresponding to the end 82 of the plank 24. Formed on a surface abutting the end 82, the plank cap 28 has a mounting tab 84 which is formed to securely mount into receptacle 81 formed on the intermediate support 42. The plank cap 28 is useful to to cover the opening of the end 82 to prevent items from being caught in the openings and to improve the aesthetics of the final assembled dock structure 14.

In FIG. 9 the plank cap 28 has been rotated with a plank abutting face 88 rotated away from the plank 24 and an outside face 80 rotated towards the plank 24. The plank cap 28 is thus illustrated to show the detail plank engaging structures formed on the plank abutting face 88. When rotated to engage the end 82 of the plank 24 the mounting tab 84 engages the receptacle 81 and bottom flanges 90, side flanges 92, top edge flanges 94 and intermediate flanges 96 frictionally engage corresponding surfaces on the inside of the end 82 of the plank 24. For example, a top surface 98 of the top edge flange 94 abuts a downwardly facing surface 100 formed on the inside off the plank 24 and an outwardly facing surface 102 abuts an inwardly facing surface 104 formed on the inside of the plank 24. The top edge flanges 94 and bottom flanges 90 locate and help to retain the cap 28 in vertical relation to the end 82 while the side flanges 92 and the intermediate flanges 96 locate and help retain the cap 28 in horizontal relation to the end 82.

FIG. 10 provides a partial perspective view of a dock structure 14 attached to an underlying support frame in which the ends 82 of the planks 24 have been covered by a common plank 86 attached to the support structure 16 generally perpendicular to the direction of the attached planks 24. This common plank 86 obviates the need for individual plank caps 28 (as illustrated in FIG. 9) and provides a means of preventing the planks from being slid out of engagement with the clip 22.

While a preferred embodiment of the present invention is shown and described, it is envisioned that those skilled in the art may devise various modifications of the present invention without departing from the spirit and scope of the appended claims.

The invention is claimed as follows:

1. A dock structure adapted for assembly with a supporting frame, said dock structure comprising: clip means adapted to be fixedly attached to said frame and a plank member adapted to be assembled with said clip means; said clip means having an elongate base portion, and plank receiving means attached to said base portion for engaging and securely retaining said plank member in engagement with said clip means; said plank member having an upper web portion and being formed with at least three flange supporting means extending from said upper web portion, each of said at least three flange supporting means having flange means formed on an end thereof distal said web portion, said flange means cooperatively engaging correspondingly formed plank receiving means for securing said plank member in engagement with said clip means attached to said frame.

2. A dock structure according to claim 1 wherein said plank member and said clip means are, respectively, unitary, one-piece integrally formed members.

3. A dock structure according to claim 2 wherein said plank member and said clip means are formed of plastic.

4. A dock structure according to claim 1 wherein said plank receiving means comprise flange engaging portions formed at spaced apart locations along said base portion and wherein said flange means comprise a pair of flanges supported distal said web portion at spaced locations for engagement with said flange engaging portions.

5. A dock structure according to claim 4 wherein said flange engaging portions comprise inwardly projecting locking tabs cantilevered over said base portion and projecting inwardly towards the center of said clip means, and wherein said flanges formed on said flange supporting means comprise laterally outwardly projecting members engagable with said clip means when positioned underneath said inwardly projecting locking tabs.

6. A dock structure according to claim 5 wherein ribs are formed on the side of said base portion of said clip means spaced from said flange engaging portions for abutting inner faces of said flanges for preventing horizontal displacement of said flanges when said flanges are fully engaged with said inwardly projecting locking tabs.

7. A dock structure according to claim 4 wherein one of said at least three flange supporting means is an intermediate flange supporting means projecting from said upper web portion, said intermediate flange supporting means having a flange formed on an end thereof distal said upper web.

8. A dock structure according to claim 7 wherein said clip means further comprises at least one intermediate flange receiving means for receiving said at least one intermediate flange.

9. A dock structure according to claim 8 wherein said intermediate flange has laterally oppositely outwardly projecting members and wherein said intermediate flange receiving means comprises a pair of spaced inwardly projecting locking tabs cantilevered over a medial portion of said base portion of said clip means and generally separated by a dimension approximately equal to the lateral dimension of said intermediate flange, said tabs generally projecting inwardly towards each other for a distance sufficient to overly and retain said laterally oppositely outwardly projecting members.

10. A dock structure according to claim 9 wherein said intermediate flange receiving means are sufficiently flexible to flex slightly outwardly away from each other to permit said laterally oppositely outwardly projecting members of said flange of said intermediate flange supporting means to pass in between inwardly facing edges of said intermediate flange receiving means when said flange is positioned thereover and a downwardly directed force applied thereto, laterally oppositely outwardly projecting members of said flange snapping into engagement underneath said inwardly projecting locking tabs.

11. A dock structure adapted for assembly with a supporting frame, said dock structure comprising: clip means adapted to be fixedly attached to said frame and a plank member adapted to be assembled with said clip means; said clip means having an elongate base portion and plank receiving means attached to said base portion for engaging and securely retaining said plank member in engagement with said clip means; said plank receiving means including flange engaging portions formed at spaced apart locations along said base portion, said flange engaging portions comprise inwardly projecting locking tabs cantilevered over said base portion and projecting inwardly towards the center of said clip means; said plank member having an upper web portion and being formed with flange supporting means extending from said upper web portion, said flange supporting means including flanges formed on an end thereof distal said web portion, said flanges include laterally outwardly projecting members cooperatively engagable with said clip means when positioned underneath said inwardly projecting locking tabs; said flanges cooperatively mating with said plank receiving means for securing said plank member in engagement with said clip means attached to said frame; ribs formed on said base portion of said clip means spaced from said flange engaging portions for abutting inner faces of said flanges positioned therebetween for preventing horizontal displacement of said flanges when said flanges are engaged with said inwardly projecting locking tabs.

12. A dock structure adapted for assembly with a supporting frame, said dock structure comprising: clip means adapted to be fixedly attached to said frame and a plank member adapted to be assembled with said clip means; said clip means having an elongate base portion, and plank receiving means attached to said base portion for engaging and securely retaining said plank member in engagement with said clip means, said plank receiving means including a first side, a second side and at least one intermediate flange engaging portion formed at spaced apart locations along said base portion; said plank member having an upper web portion and a first and second side flange supporting means extending from spaced apart sides of said upper web portion and at least one intermediate flange supporting means projecting from said upper web portion spaced between said first and second side flange supporting means, said first, second and at least one intermediate flange supporting means having flange means formed on an end thereof distal said web portion, said first side, second side and at least one intermediate flange means cooperatively mating with correspondingly positioned plank receiving means for securing said plank member in engagement with said clip means attached to said frame.

13. A dock structure according to claim 12 wherein said flange formed on said at least one intermediate flange supporting means includes outwardly projecting members and wherein said intermediate flange receiving means comprises a pair of spaced, inwardly projecting, locking tabs cantilevered over a medial portion of said base portion of said clip means and generally separated by a dimension approximately equal to the lateral dimension of said intermediate flange, said tabs projecting inwardly towards each other a distance sufficient to overlie and retain said outwardly projecting members.

14. A dock structure according to claim 13 wherein said at least one intermediate flange receiving means are sufficiently flexible to flex slightly outwardly away from each other to permit said outwardly projecting members of said flange of said at least one intermediate flange supporting means to pass between inwardly facing edges of said at least one intermediate flange receiving means when said flange is positioned thereover and a downwardly directed force applied thereto, outwardly projecting members of said flange snapping into engagement underneath said inwardly projecting locking tabs.

15. A dock structure adapted for assembly with a supporting frame, said structure comprising: clip means adapted to be securely fixedly attached to said frame, said clip means having an elongate base portion with plank receiving means integrally formed thereon, said plank receiving means including flange engaging portions formed at spaced apart locations along said base portion; a plank member having an upper web portion integrally formed with at least two flange supporting means for supporting said upper web portion a distance above said base operation, a flange integrally formed on an end of at least one of said two flange supporting means distal said upper web portion, said plank receiving means engagably receiving said flange portion or retaining said plank member in engagement with said clip means, said flange engaging portions including projecting locking tabs cantilevered over said base portion and projecting inwardly towards the center of said clip means, said flanges include outwardly projecting members engagable with said inwardly projecting locking tabs when engaged underneath said locking tabs; said clip means and said plank member being independent, unitary, one-piece members integrally formed of plastic.

16. A dock structure adapted for assembly with a supporting frame, said structure comprising: clip means adapted to be securely fixedly attached to said frame said clip means having an elongate base portion with plank receiving means integrally formed thereon for receiving at least one flange of a plank ember positioned thereagainst; a plank member having an upper web portion integrally formed with at least three flange supporting means for supporting said supper web portion a distance above said base portion, said at least three flange supporting means including a first and second side flange supporting means and at least one intermediate flange supporting means spaced between said first side and second side flange supporting means, a flange integrally formed on an end of said intermediate flange supporting means distal said upper web portion, said flange being engaged in a corresponding plank receiving means for retaining said plank member in engagement with said clip means; said clip means and said plank member being, respectively, unitary, one-piece members integrally formed of plastic.

17. A dock structure according to claim 16 wherein said intermediate flange supporting means has laterally oppositely outwardly projecting members and wherein said plank receiving means comprises a pair of inwardly projecting spaced apart locking tabs cantilevered over a medial portion of said clip mans and generally separated by a dimension approximately equal to the lateral dimension of said intermediate flange, said locking tabs generally projecting inwardly towards each other for a distance sufficient to overly and retain said laterally oppositely outwardly projecting members, said plank receiving means are sufficiently flexible to flex slightly outwardly away from each other to permit said laterally oppositely outwardly projecting members of said flange of said intermediate flange supporting means to pass between the inner edge of said plank receiving means when said flange is positioned thereover and a downwardly directed force applied thereto, outwardly projecting members of said flange snapping into engagement underneath said inwardly projecting locking tabs.

18. A method of assembling a dock structure adapted for assembly with a supporting frame, comprising the following steps: providing clip means adapted for attachment to said frame, said clip means having an elongate base portion to which is attached plank receiving means; providing a plank member adapted for assembly with said clip means, said plank member having an upper web portion and being formed with flange supporting means extending from said upper web portion, said flange supporting means having flange means formed on an end thereof distal said web portion which cooperatively mates with said plank receiving means; mounting said clip means to said frame with said plank receiving means oriented in a plank receiving direction; positioning a projecting portion of said flange of said flange supporting means of said plank member underneath an inwardly projecting locking tab cantilevered over said elongate base portion of said clip means; flexing said plank member from the side not retained under said locking tab to position a laterally outwardly projecting member of a flange on a distal end of a flange supporting means of said unretained side underneath a corresponding inwardly projecting locking tab of a corresponding plank receiving means; positioning an intermediate flange formed on an intermediate flange supporting means attached to said plank member over a corresponding intermediate flange receiving means formed on said clip means; applying a force to a top surface of said plank member, at a position generally opposite said intermediate flange sufficient to snap said intermediate flange into engagement with said intermediate flange receiving means.

* * * * *

UNITED STATES PATENT AND TRADEMARK OFFICE
CERTIFICATE OF CORRECTION

PATENT NO. : 5,048,448
DATED : September 17, 1991
INVENTOR(S) : Dennis G. Yoder

It is certified that error appears in the above-identified patent and that said Letters Patent is hereby corrected as shown below:

Column 8, Line 55 " above said base operation, a flange integrally formed "

it should read--above said base portion, a flange integrally formed--

Column 8, Line 58 " engagably receiving said flange portion or "

it should read -- engagably receiving said flange portion for --

Column 9, Line 6 " receiving at least one flange of a plank ember"

it should read -- receiving at least one flange of a plank member --

Column 9, Line 9 " supporting means for supporting said supper web "

it should read -- supporting means for supporting said upper web --

Signed and Sealed this

Second Day of March, 1993

Attest:

STEPHEN G. KUNIN

*Attesting Officer*     Acting Commissioner of Patents and Trademarks